(12) United States Patent
Kato

(10) Patent No.: US 9,837,774 B2
(45) Date of Patent: Dec. 5, 2017

(54) FIXING STRUCTURE BETWEEN BUSBAR AND TERMINAL

(71) Applicant: YAZAKI CORPORATION, Tokyo (JP)

(72) Inventor: Hiroyuki Kato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/341,909

(22) Filed: Nov. 2, 2016

(65) Prior Publication Data

US 2017/0125956 A1    May 4, 2017

(30) Foreign Application Priority Data

Nov. 4, 2015 (JP) ................... 2015-216721

(51) Int. Cl.
*H01R 33/00* (2006.01)
*H01R 25/16* (2006.01)

(52) U.S. Cl.
CPC .................. *H01R 25/162* (2013.01)

(58) Field of Classification Search
CPC .................................................. H01R 25/162
USPC ......... 439/877, 623, 881, 627, 502, 99, 158, 439/160
See application file for complete search history.

(56) References Cited

U.S. PATENT DOCUMENTS

| | | | | | |
|---|---|---|---|---|---|
| 3,546,664 | A | * | 12/1970 | Bolt | H01R 13/115 439/866 |
| 4,325,598 | A | * | 4/1982 | Leonardo | H01R 4/2408 439/391 |
| 4,421,375 | A | * | 12/1983 | Coldren | H01R 4/2462 439/423 |
| 4,455,057 | A | * | 6/1984 | Mariani | H01R 4/2425 174/84 C |
| 4,842,534 | A | * | 6/1989 | Mobley | H01H 85/2035 337/191 |
| 4,993,959 | A | * | 2/1991 | Randolph | H01R 4/64 439/855 |
| 5,755,820 | A | * | 5/1998 | Lan-Jen | H01R 13/405 439/694 |
| 6,152,776 | A | * | 11/2000 | Ikeda | H01M 2/1077 429/121 |
| 6,168,470 | B1 | * | 1/2001 | Ikeda | H01M 2/206 439/620.08 |
| 6,297,447 | B1 | * | 10/2001 | Burnett | H01R 9/0524 174/40 CC |
| 7,182,625 | B2 | * | 2/2007 | MacHado | H01R 4/2425 439/395 |

(Continued)

FOREIGN PATENT DOCUMENTS

JP    2014-60093 A    4/2014

*Primary Examiner* — Abdullah Riyami
*Assistant Examiner* — Nelson R Burgos-Guntin
(74) *Attorney, Agent, or Firm* — Kenealy Vaidya LLP

(57) ABSTRACT

A fixing structure between a busbar and a terminal includes a busbar and a terminal. The busbar includes a busbar main body, an arm, and a fixing target portion. The terminal includes a wire connection portion to which a wire is to be electrically connected, a busbar fixing portion which is fixed and electrically connected to the fixing target portion of the busbar, and an arm fixing portion provided between the wire connection portion and the busbar fixing portion and fixed to the arm of the busbar.

8 Claims, 12 Drawing Sheets

(56) References Cited

U.S. PATENT DOCUMENTS

| | | | | |
|---|---|---|---|---|
| 8,133,608 B2* | 3/2012 | Hermann | .............. | H01M 2/204 320/118 |
| 8,388,382 B2* | 3/2013 | Ikeda | ................. | H01M 2/1077 439/397 |
| 8,822,062 B2* | 9/2014 | Ikeda | ................... | H01M 2/206 429/149 |
| 2010/0015519 A1* | 1/2010 | Trester | ................. | H01M 10/48 429/160 |
| 2015/0024634 A1* | 1/2015 | Nakayama | ........... | H01M 2/206 439/627 |
| 2015/0188244 A1* | 7/2015 | Yoshioka | ............... | H01M 2/20 439/442 |

* cited by examiner

FIXING STRUCTURE BETWEEN BUSBAR AND TERMINAL

CROSS-REFERENCE TO RELATED APPLICATIONS

The present application claims priority from Japanese Patent Application No. 2015-216721 filed on Nov. 4, 2015, the entire content of which is incorporated herein by reference.

FIELD OF INVENTION

The present invention relates to a busbar-terminal fixing structure and a busbar module.

RELATED ART

JP-A-2014-060093 discloses a fixing structure for electrical connection between a busbar and an electric wire (hereinafter referred to as a wire) in which the busbar is formed with a crimping target portion that projects from a busbar main body and a terminal that is crimped onto the wire is fixed to the crimping target portion of the busbar by crimping.

In the fixing structure of JP-A-2014-060093, if external force acts on the terminal from the wire during routing the wire, there may occur an event that force is concentrated on a base portion where the terminal and the crimping target portion of the busbar are fixed to each other by crimping and the reliability of connection of the portion where the terminal and the crimping target portion of the busbar are electrically connected to each other is thereby lowered.

SUMMARY

Illustrative aspects of the present invention provide a busbar-terminal fixing structure in which a reliability of connection of a portion where a busbar and a terminal are electrically connected to each other is kept high, as well as a busbar module having such a busbar-terminal fixing structure.

According to an illustrative aspect of the present invention, a fixing structure between a busbar and a terminal includes a busbar and a terminal. The busbar includes a busbar main body, an arm, and a fixing target portion. The busbar main body, the arm, and the fixing target portion are integrated into a single piece. The terminal includes a wire connection portion to which a wire is to be electrically connected, a busbar fixing portion which is fixed and electrically connected to the fixing target portion of the busbar, and an arm fixing portion provided between the wire connection portion and the busbar fixing portion and fixed to the arm of the busbar.

Other aspects and advantages of the invention will be apparent from the following description, the drawings and the claims.

BRIEF DESCRIPTION OF THE DRAWINGS

FIG. 1A is a plan view of a busbar, a wire, and a terminal, and FIG. 1B is a side view of the busbar and the wire as viewed from the terminal connection side.

DETAILED DESCRIPTION

Figure 1A:
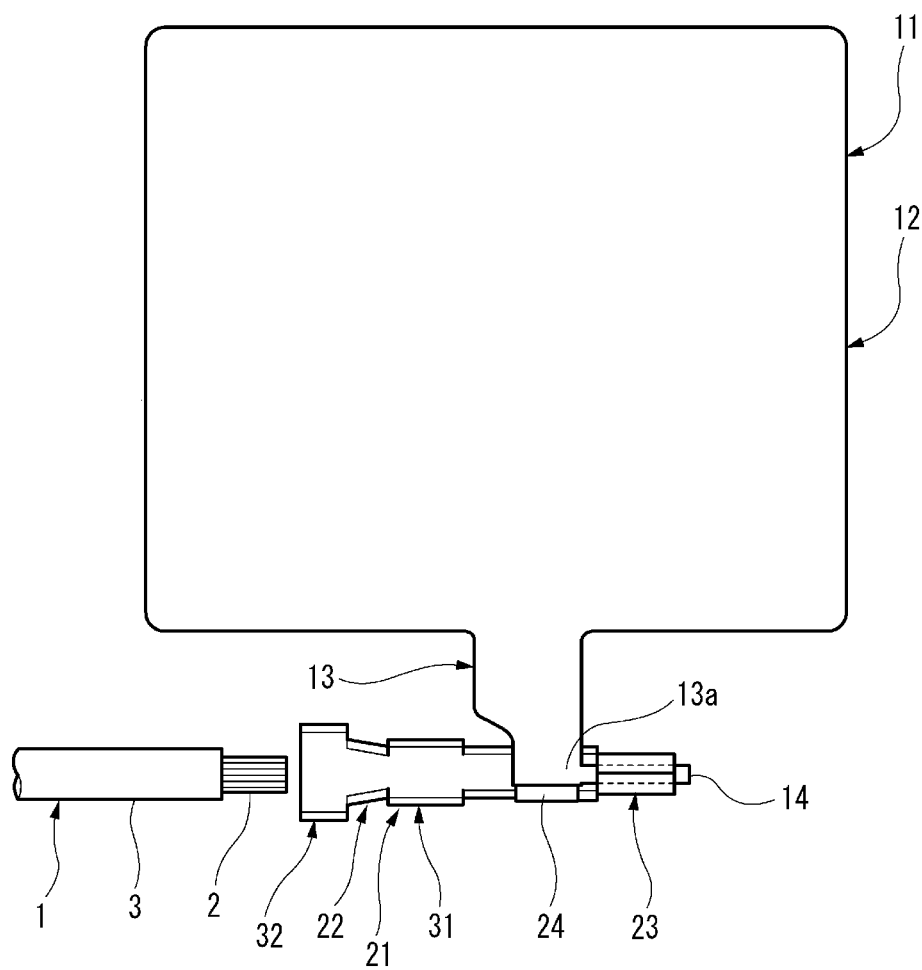
FIGS. 1A and 1B show a busbar-terminal fixing structure according to an exemplary embodiment of the present invention.
Figure 1B:
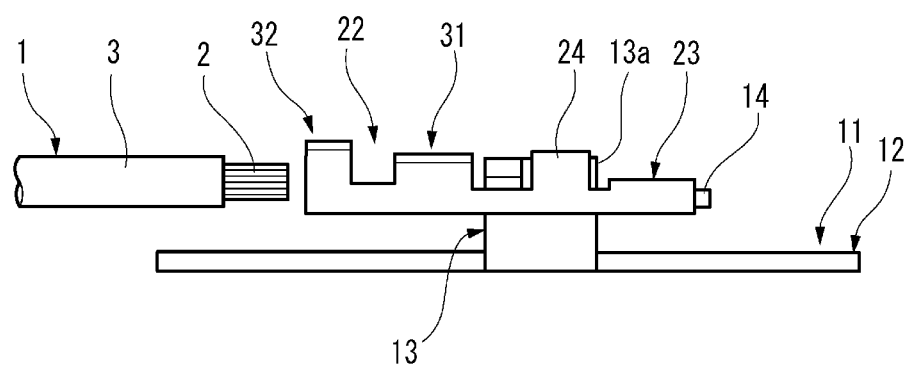
Figure 2:
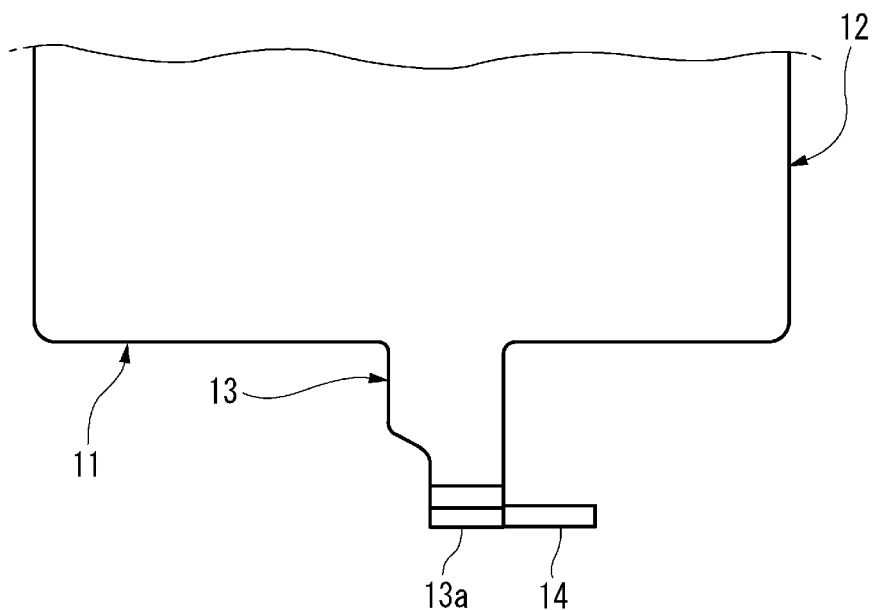
FIG. 2 is a plan view of part of the busbar.
Figure 3:
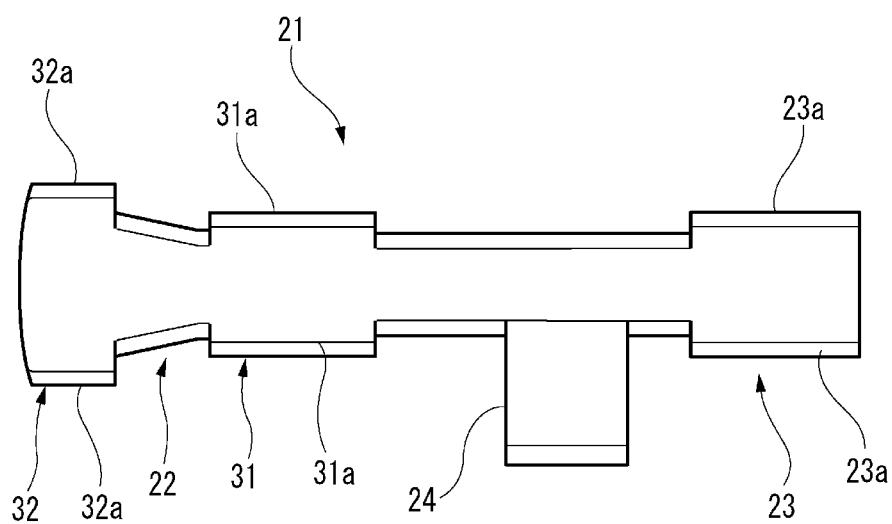
FIG. 3 is a plan view of the terminal.
Figure 4A:
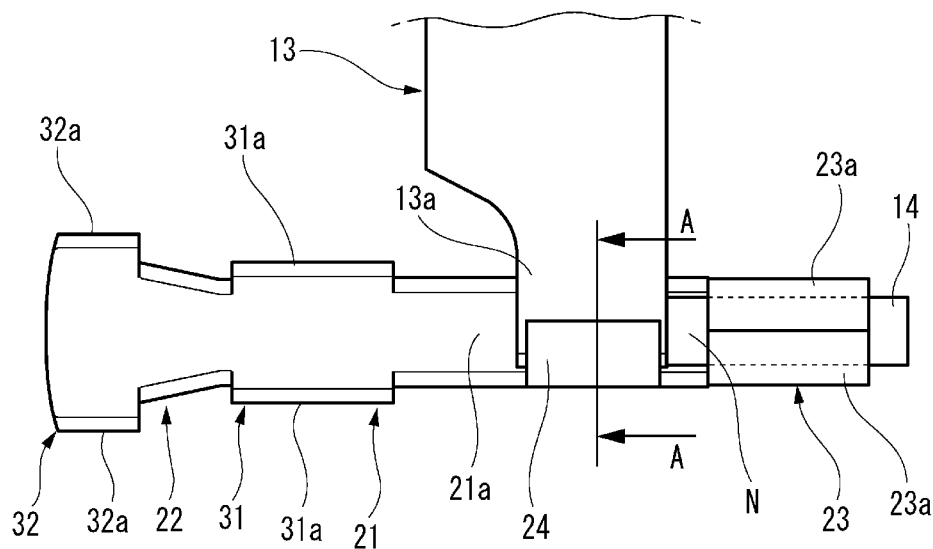
FIGS. 4A and 4B are a plan view and a side view, respectively, of a portion where the busbar and the terminal are connected to each other.
Figure 4B:
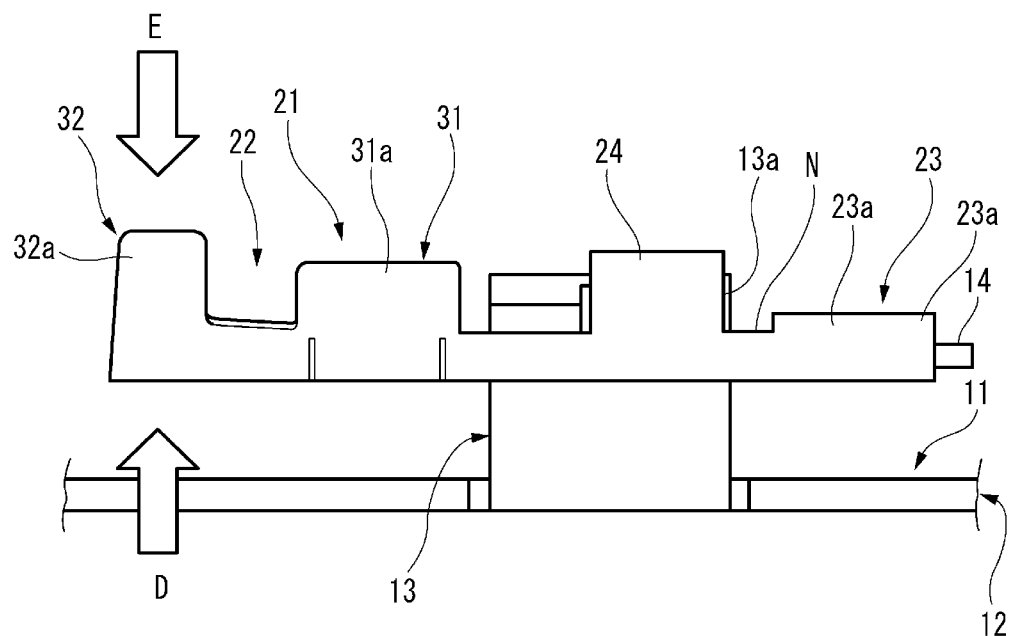
Figure 5:
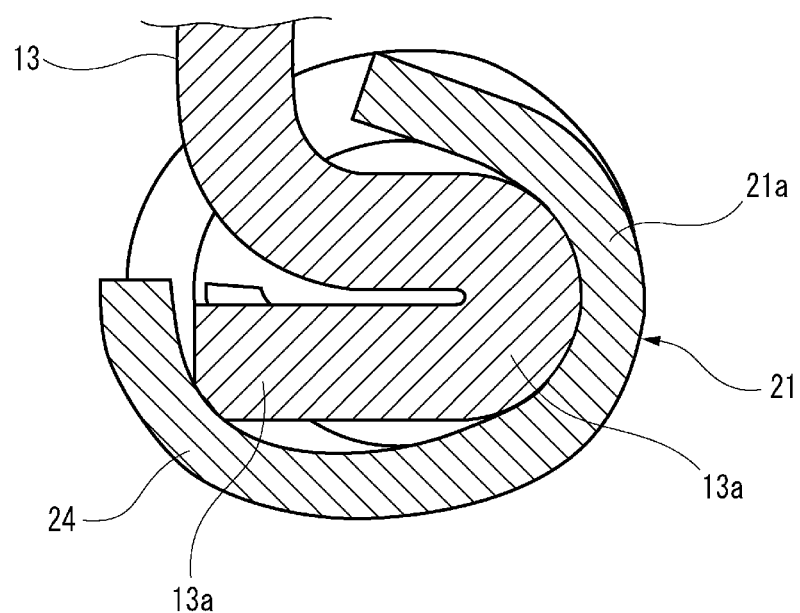
FIG. 5 is a sectional view taken along line A-A in FIG. 4A.
Figure 6:
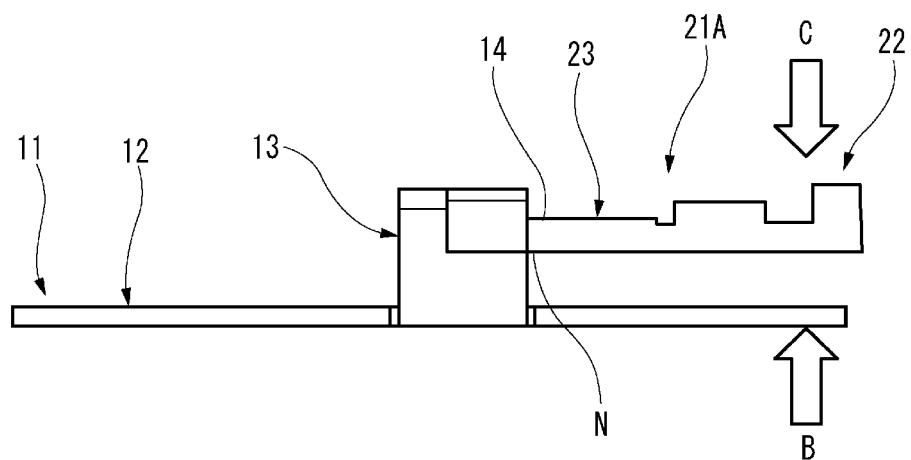
FIG. 6 is a side view, as viewed from the terminal connection side, of a referential busbar-terminal fixing structure.

An exemplary embodiment will be hereinafter described with reference to the drawings. FIGS. 1A and 1B show a busbar-terminal fixing structure according to the exemplary embodiment; FIG. 1A is a plan view of a busbar 11, a wire 1, and a terminal 21, and FIG. 1B is a side view of the busbar 11 and the wire 1 as viewed from the terminal connection side. FIG. 2 is a plan view of part of the busbar 11. FIG. 3 is a plan view of the terminal 21. FIGS. 4A and 4B are a plan view and a side view, respectively, of a portion where the busbar 11 and the terminal 21 are connected to each other. FIG. 5 is a sectional view taken along line A-A in FIG. 4A. FIG. 6 is a side view, as viewed from the terminal connection side, of a referential busbar-terminal fixing structure.

As shown in FIGS. 1A and 1B, the busbar-terminal fixing structure according to the embodiment is a busbar-terminal fixing structure for connection, to the busbar 11, of the terminal 21 to which the wire 1 is connected.

As shown in FIG. 2, the busbar 11 has a busbar main body 12, an arm 13, and a fixing target portion 14. The busbar 11 is formed by, for example, pressing a plate made of a conductive metal material. The busbar main body 12, the arm 13, and the fixing target portion 14 are integrally formed in one piece.

The busbar main body 12 is rectangular in a plan view, and an arm 13 projects from it. However, the plan shape of the busbar main body 12 is not limited to a rectangle and may be an ellipse, for example.

The arm 13 projects outward from an edge of the busbar main body 12. The arm 13 has, at the tip, a swaging target portion 13a which is bent so as to be U-shaped in a sectional view (see FIG. 5). A middle portion of the arm 13 is inclined so as to go up as it goes away from the busbar main body 12. As a result, a tip portion, having the swaging target portion 13a is located above the busbar main body 12.

The fixing target portion 14 projects from one side edge of the tip portion of the arm 13 so as to extend in the direction that is perpendicular to the projecting direction of the arm 13. As a result, the fixing target portion 14 extends approximately parallel with the edge, from which the arm 13 projects, of the busbar main body 12 with a gap formed between them.

As shown in FIG. 3, the terminal 21 has a wire connection portion 22, a busbar fixing portion 23, and an arm fixing portion 24. The terminal 21 is formed by, for example, pressing a plate made of a conductive metal material. The busbar fixing portion 23 is formed at the tip of the terminal 21, and the wire connection portion 22 is a rear portion of the terminal 21. The arm fixing portion 24 is formed between the wire connection portion 22 and the busbar fixing portion 23. The wire 1 is electrically connected to the wire connection portion 22. The wire 1, which is connected to the wire connection portion 22, is an insulated wire in which a conductor 2 is covered with a covering 3 made of an insulative resin. A portion of the conductor 2 is exposed from the covering 3 in an end portion concerned of the wire 1 (refer to FIGS. 1A and 1B).

The wire connection portion 22 has a conductor crimping portion 31 and a covering crimping portion 32 which are arranged in this order from the side of the arm fixing portion 24. The conductor crimping portion 31 has a pair of conductor crimping pieces 31a and the covering crimping portion 32 has a pair of covering crimping pieces 32a.

The busbar fixing portion 23 is fixed to the fixing target portion 14 of the busbar 11 and thereby electrically connected thereto. The busbar fixing portion 23 has a pair of busbar crimping pieces 23a.

The arm fixing portion 24 projects sideways from a side edge of a portion, between the wire connection portion 22 and the busbar fixing portion 23, of the terminal 21. The arm fixing portion 24 has approximately the same width as the swaging target portion 13a of the arm 13 of the busbar 11.

In a state that an end portion, where a portion of the conductor 2 is exposed from the covering 3, of the wire 1 is placed on the wire connection portion 22 of the terminal 21, the conductor crimping pieces 31a of the conductor crimping portion 31 are crimped onto the conductor 2 of the wire 1 and the covering crimping pieces 32a of the covering crimping portion 32 are crimped onto the covering 3 of the wire 1. As a result, the wire 1 is electrically connected to the wire connection portion 22 of the terminal 21. The method for connecting the wire 1 to the wire connection portion 22 is not limited to crimping and may be, for example, ultrasonic bonding or pressure welding.

As shown in FIGS. 4A and 4B, the tip-side busbar fixing portion 23 of the terminal 21 is fixed, by crimping, to the fixing target portion 14 of the arm 13 of the busbar 11. As a result, the busbar 11 and the terminal 21 are electrically connected to each other at the portion where the busbar fixing portion 23 is fixed, by crimping, to the fixing target portion 14. Furthermore, the middle arm fixing portion 24 of the terminal 21 is fixed (fastened), by swaging, to the tip swaging target portion 13a of the arm 13.

As shown in FIG. 5, the arm fixing portion 24 is swaged onto the swaging target portion 13a of the arm 13, whereby a tip portion of the arm fixing portion 24 is located at such a position as to cover a top portion of the swaging target portion 13a. A bottom portion 21a of the terminal 21 and the arm fixing portion 24 are wound on the swaging target portion 13a of the arm 13 over approximately its entire circumference, whereby the portion, between the busbar fixing portion 23 and the wire connection portion 22, of the terminal 21 are fixed (fastened) strongly to the arm 13.

To connect the terminal 21 to the busbar 11, first, the busbar fixing portion 23 of the terminal 21 is placed under the fixing target portion 14 of the arm 13 and the middle portion, between the busbar fixing portion 23 and the wire connection portion 22, of the terminal 21 is placed under the swaging target portion 13a of the arm 13. In this state, the busbar crimping pieces 23a of the busbar fixing portion 23 of the terminal 21 and the arm fixing portion 24 are swaged. As a result, the tip-side busbar fixing portion 23 of the terminal 21 is fixed, by crimping, to the fixing target portion 14 of the arm 13 and the middle arm fixing portion 24 of the terminal 21 is fixed (fastened) to the tip swaging target portion 13a of the arm 13. Thus, the terminal 21 whose wire connection portion 22 is electrically connected to the wire 1 is fixed to and electrically connected to the busbar 11.

Incidentally, in a fixing structure shown in FIG. 6 for fixing of a terminal 21A not having the arm fixing portion 24 to the fixing target portion 14 of the busbar 11, absent the arm fixing portion 24, the terminal 21A is fixed to the busbar 11 only at the portion where the busbar fixing portion 23 is fixed, by crimping, to the fixing target portion 14 of the busbar 11.

As a result, in this fixing structure, if external force is exerted from the wire 1 to the terminal 21A in, for example, the vertical direction (indicated by arrow B or C in FIG. 6) at the time of, for example, routing of the wire 1, force is concentrated on a base portion N of the fixing target portion 14 of the busbar 11, possibly lowering the reliability of connection of the portion where the fixing target portion 14 and the terminal 21A are connected to each other.

In contrast, in the fixing structure according to the embodiment, the portion, between the wire connection portion 22 and the busbar fixing portion 23, of the terminal 21 is fixed to the arm 13 by swaging the arm fixing portion 24 located between the wire connection portion 22 and the busbar fixing portion 23 onto the arm 13.

As a result, even if external force is exerted from the wire 1 to the terminal 21 in, for example, the vertical direction (indicated by arrow D or E in FIG. 4B) at the time of, for example, routing of the wire 1, the degree of concentration of force on a base portion N of the portion where the busbar fixing portion 23 of the terminal 21 is fixed to the fixing target portion 14 which projects from the side edge of the arm 13 is made very low. Thus, the influence of external force on the portion where the busbar fixing portion 23 of the terminal 21 is fixed to the fixing target portion 14 of the busbar 11 is minimized, whereby the reliability of connection of the portion where the busbar 11 and the terminal 21 are electrically connected to each other can be kept high.

The busbar fixing portion 23 of the terminal 21 is crimped onto the fixing target portion 14 and the arm fixing portion 24 of the terminal 21 is fixed, by swaging, to the tip swaging target portion 13a of the arm 13. Thus, crimping of the busbar fixing portion 23 onto the fixing target portion 14 and fixing of the arm fixing portion 24 to the swaging target portion 13a of the arm 13 can be performed as swaging operations of the same step. This makes it possible to fix the terminal 21 to the busbar 11 strongly without unduly complicating work of connecting the terminal 21 to the busbar 11.

Next, a description will be made of a busbar module to which the busbar-terminal fixing structure according to the embodiment is applied.

Figure 7:
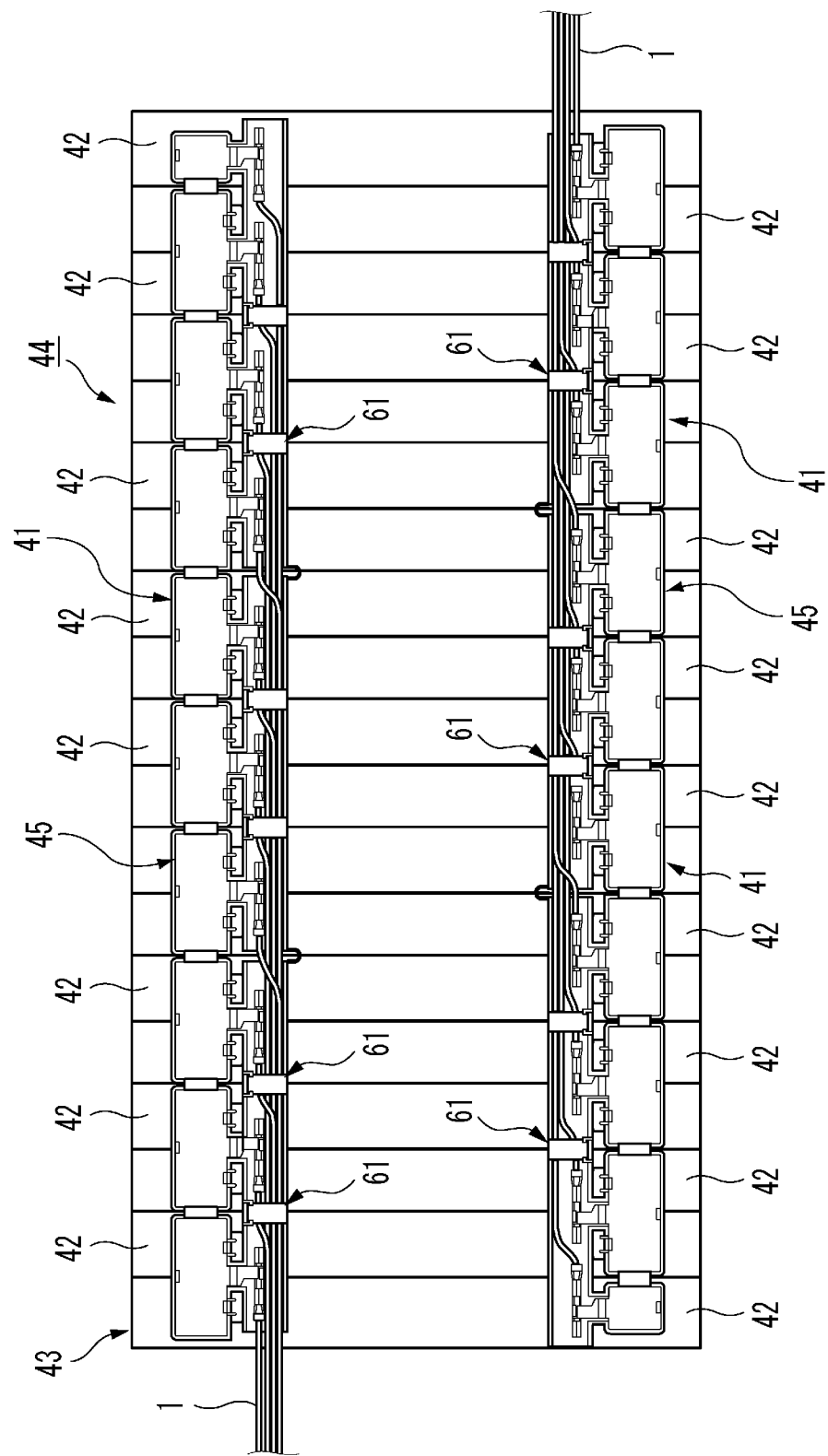
FIG. 7 is a perspective view of a power source device which is mounted with busbar modules to which the busbar-terminal fixing structure according to the embodiment is applied.
Figure 8:
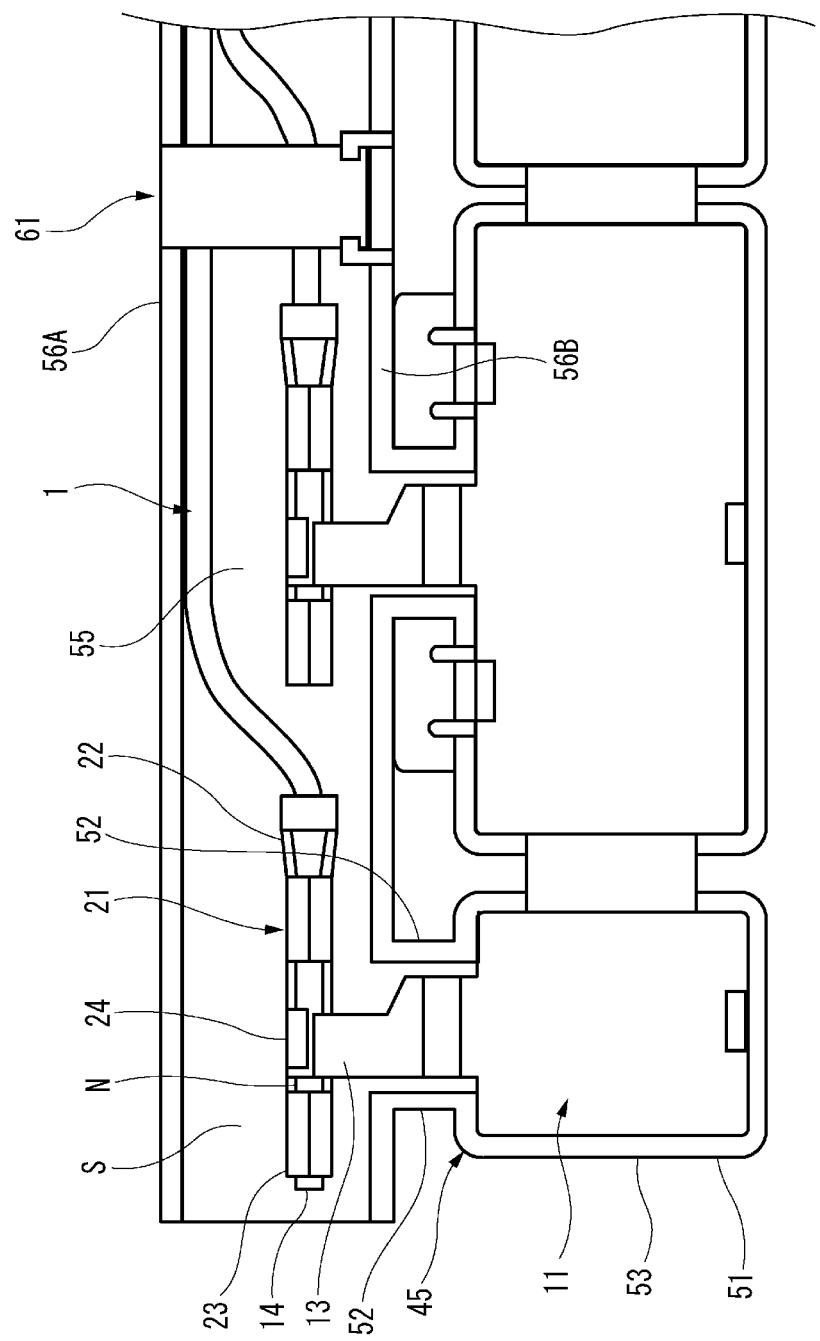
FIG. 8 is a plan view of part of each busbar module.
Figure 9:
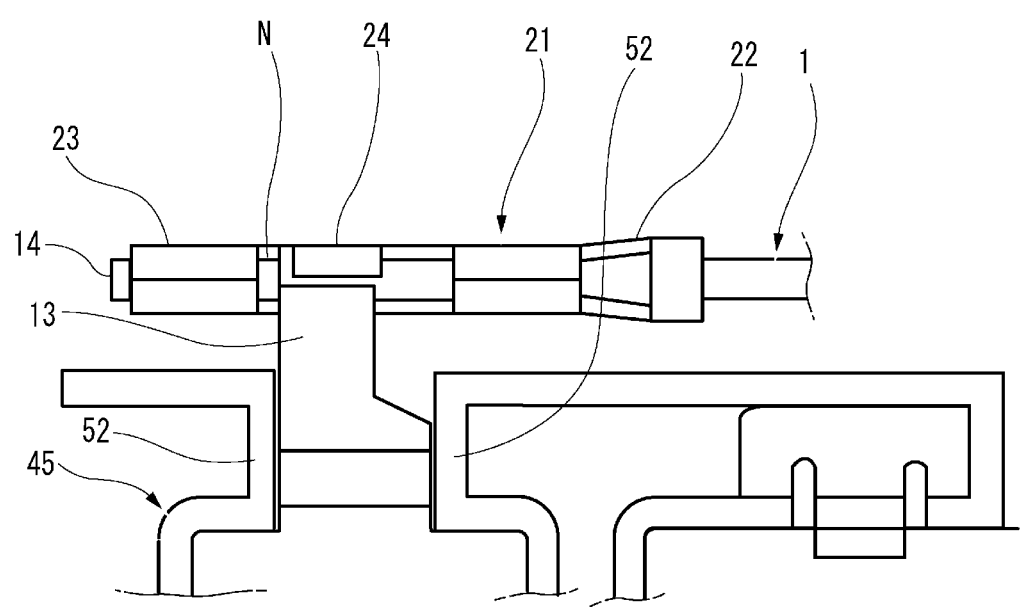
FIG. 9 is a plan view of a portion where a terminal is connected to a busbar that is mounted in a wire routing body.

FIG. 7 is a perspective view of a power source device 44 which is mounted with busbar modules 41 to which the busbar-terminal fixing structure according to the embodiment is applied. FIG. 8 is a plan view of part of each busbar module 41. FIG. 9 is a plan view of a portion where a terminal 21 is connected to a busbar 11 that is mounted in a wire routing body 45.

As shown in FIG. 7, the power source device 44 is constructed in such a manner that the busbar modules 41 are attached to (placed on) a battery assembly 43 having plural battery cells 42. The power source device 44 is installed in, for example, an electric vehicle which runs using an electric motor or a hybrid vehicle which runs using both of an engine and an electric motor, and supplies electric power to an electric motor.

Each busbar module 41 is equipped with a resin wire routing body 45 (holding member) which holds busbars 11. Busbars 11 are fastened to electrodes that project from the plural battery cells 42 that constitute the battery assembly 43. End portions of wires 1 leading from voltage detection devices (not shown) are connected to terminals 21.

As shown in FIG. 8, each wire routing body 45 has a frame-shaped busbar housing unit 51 which houses and holds a busbar 11. A circumferential wall 53 of the busbar housing unit 51 has an open portion which is a connection portion housing space S in which the portion where the arm 13 of the busbar 11 and the terminal 21 are connected to each other is disposed. The wire routing body 45 has a wire routing groove 55 which communicates with the connection portion housing space S of the busbar housing unit 51 which houses wires 1. The wire routing groove 55 is formed by a pair of side walls 56A and 56B which are located on the two respective sides. The wire routing groove 55 is provided with a wire holding unit 61 which holds the wires 1 housed in the wire routing groove 55.

As shown in FIG. 9, the wire routing body 45 has a pair of support walls 52 in the connection portion housing space S. The support walls 52 are located on both sides in the direction that is perpendicular to the direction in which the arm 13 extends from the busbar main body 12, so as to form almost no gaps between the arm 13 and themselves. With this structure, the arm 13 is disposed so as to be fitted between the pair of support walls 52 of the wire routing body 45 and both its side portions are supported by the support walls 52.

With the busbar module 41 having the above structure, since the portion, between the wire connection portion 22 and the busbar fixing portion 23, of the terminal 21 is fixed to the arm 13 by the arm fixing portion 24, even if external force is exerted from the wire 1 to the terminal 21 at the time of, for example, routing of the wire 1, the degree of concentration of force on the base portion N of the portion where the busbar fixing portion 23 of the terminal 21 is fixed to the fixing target portion 14 which projects from the side edge of the arm 13 is made very low. Thus, the influence of external force on the portion where the busbar fixing portion 23 of the terminal 21 is fixed to the fixing target portion 14 of the busbar 11 is minimized, whereby the busbar module 41 is achieved in which the reliability of connection of the portion where the busbar 11 and the terminal 21 are electrically connected to each other can be kept high.

In each busbar module 41, the busbar main body 12 is held by the resin wire routing body 45 and the arm 13 which projects from the busbar main body 12 is supported by the support walls 52 which are located on both sides in the direction that is perpendicular to the direction in which the arm 13 extends from the busbar main body 12.

With this structure, even if the wire 1 is pulled at the time of, for example, its routing and external force thereby acts on the arm 13 in the direction perpendicular to its projecting direction, since both side portions of the arm 13 are supported by the support walls 52 of the wire routing body 45, deformation of the arm 13 by such external force can be suppressed and the reliability of connection can be increased further.

Next, a description will be made of the wire holding unit 61 which is provided in the wire routing body 45 of each busbar module 41.

Figure 10A:
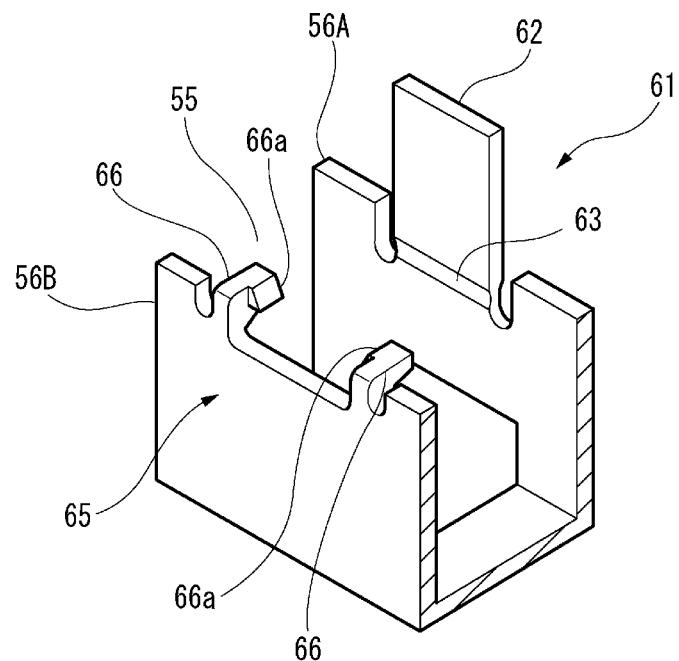
FIGS. 10A and 10B are a perspective view and a sectional view, respectively, of a wire holding unit which is provided in the wire routing body.
Figure 10B:
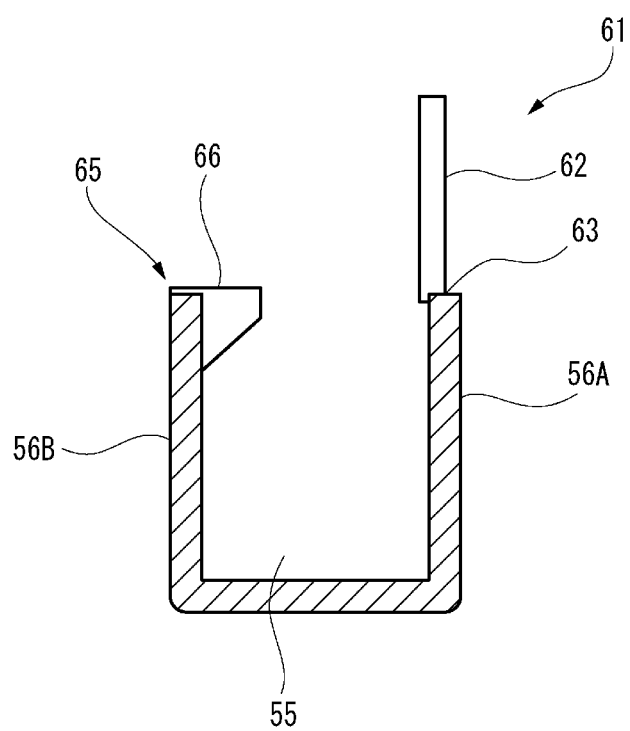
Figure 11A:
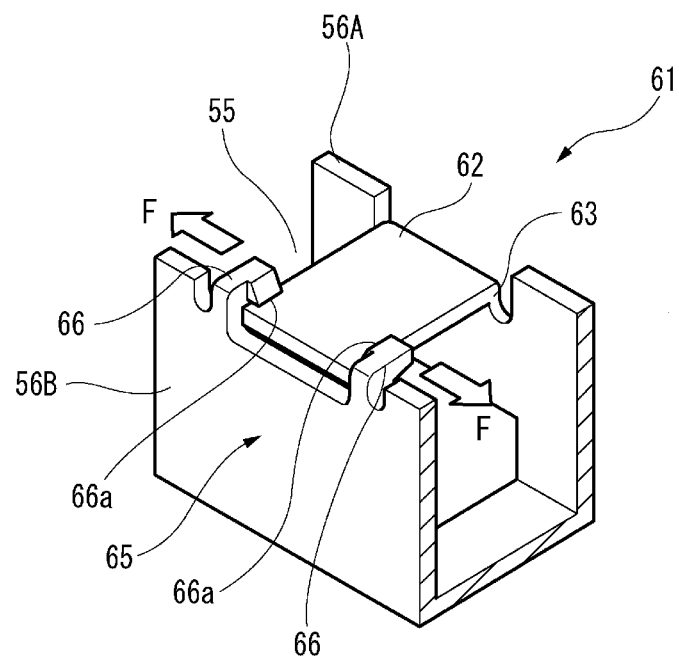
FIGS. 11A and 11B are a perspective view and a sectional view, respectively, of the wire holding unit whose lid is closed.
Figure 11B:
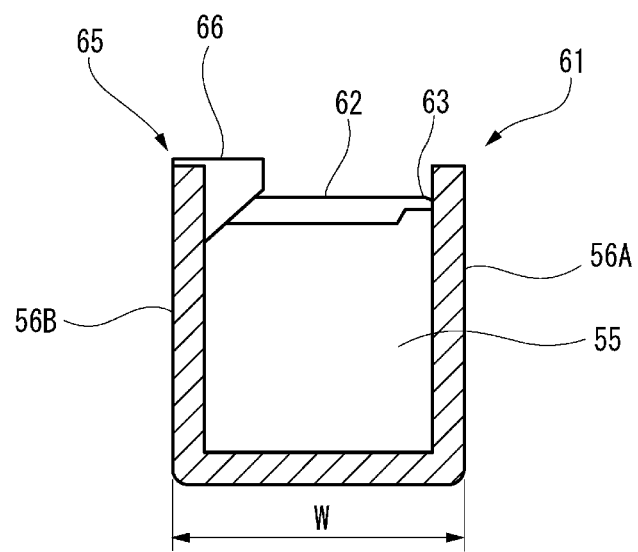
Figure 12A:
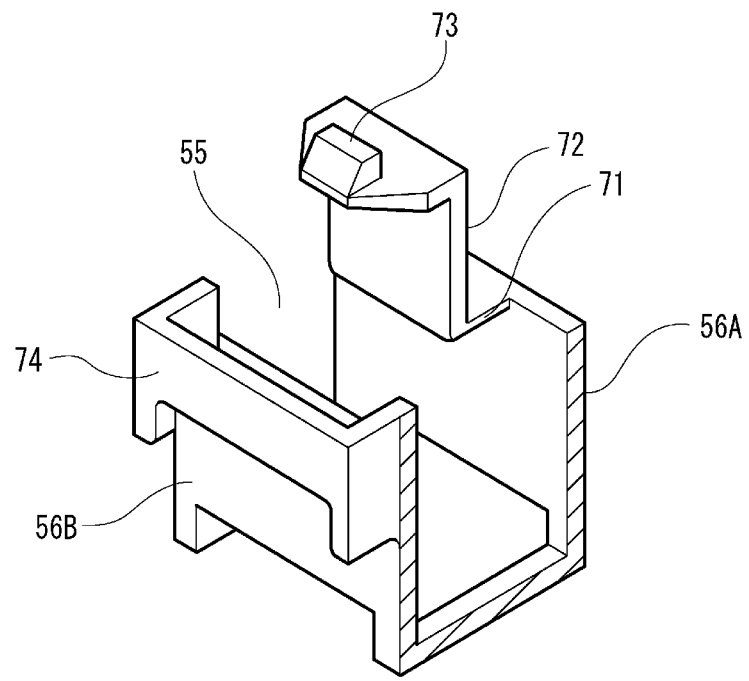
FIGS. 12A and 12B are a perspective view and a sectional view, respectively, of a referential wire holding unit.
Figure 12B:
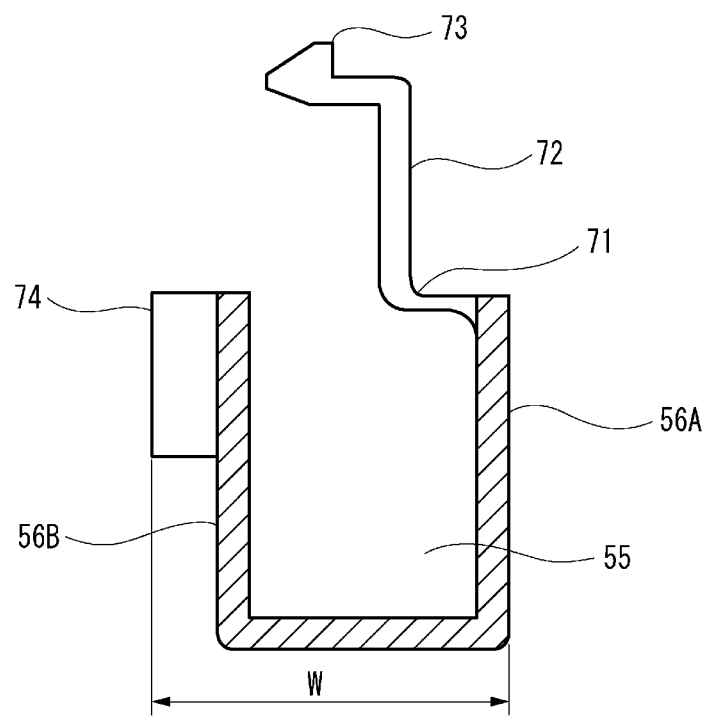

FIGS. 10A and 10B are a perspective view and a sectional view, respectively, of the wire holding unit 61 which is provided in the wire routing body 45. FIGS. 11A and 11B are a perspective view and a sectional view, respectively, of the wire holding unit 61 whose lid 62 is closed. FIGS. 12A and 12B are a perspective view and a sectional view, respectively, of a referential wire holding unit.

As shown in FIGS. 10A and 10B, the wire holding unit 61 has the lid 62 and a lock portion 65. Of the side walls 56A and 56B which form the wire routing groove 55, the one side wall 56A is formed with the lid 62 and the other side wall 56B is formed with the lock portion 65. The lid 62 is connected to the one side wall 56A rotatably by a hinge 63. The lock portion 65 has a pair of lock nail portions 66. The other side wall 56B is formed with the lock nail portions 66 which are spaced from each other and project toward the one side wall 56A. The lock nail portions 66 have respective nails 66a which project inward, that is, toward each other. The interval between the nails 66a is set slightly shorter than the width of the lid 62.

In the thus-configured wire holding unit 61, as shown in FIGS. 11A and 11B, when the lid 62 is swung toward the other side wall 56B and pushed into the space between the lock nail portions 66 of the lock portion 65, the nails 66a of the lock nail portions 66 are pushed outward by the lid 62 and the lock nail portions 66 are deformed elastically in such a direction as to go away from each other (indicated by arrows F in FIG. 11A). When pushed further, the lid 62 clears the nails 66a and comes to be located below them, whereupon the lock nail portions 66 recover from the elastically deformed states. If the push on the lid 62 is finished in this state, the lid 62 comes to return, that is, be swung in the direction reverse to the push direction, and is thereby locked on the nails 66a of the lock nail portions 66. As a result, in the wire holding unit 61, the wire routing groove 55 is closed by the lid 62 from above, whereby the wires 1 housed in the wire routing groove 55 are prevented from sticking out.

Incidentally, as shown in FIGS. 12A and 12B, another wire holding unit is conceivable which has a structure that a lid 72 that is connected to the one side wall 56A by a hinge 71 is formed with a lock nail portion 73 and the other side wall 56B is formed with a lock piece 74 outside. The wire routing groove 55 is closed by the lid 62 from above by locking the lock nail portion 73 of the lid 72 on the lock piece 74. However, in this wire holding unit, the lock piece 74 on which the lock nail portion 73 of the lid 72 is to be locked projects outward from the other side wall 56B, as a result of which the total width W of the wire holding unit is increased. Furthermore, this projected portion may interfere with another component, for example.

In contrast, in the above-described wire holding unit 61, the lock nail portions 66 on which the lid 62 is to be locked project from the other side wall 56B toward the one side wall 56A. Thus, the wire holding unit 61 is free of increase of its total width due to outward projection of some portion from the other side wall 56B and hence can be miniaturized. Furthermore, the wire holding unit 61 is free of a problem that a projected portion interferes with another component.

The invention is not limited the above embodiment, and various modifications, improvements, etc. can be made as appropriate. And the material, shape, dimensions, number (where plural ones are provided), location, etc. of each constituent element of the embodiment are optional and no limitations are imposed on them as long as the invention can be implemented.

According to embodiments, a fixing structure between a busbar 11 and a terminal 21 includes a busbar 11, and a terminal 21. The busbar 11 includes a busbar main body 12, an arm 13 projecting from the busbar main body 12, and a fixing target portion 14 projecting from the arm 13. The busbar main body 12, the arm 13, and the fixing target portion 14 are integrally formed in a single piece. The terminal 21 includes a wire connection portion 22 to which a wire 1 is to be electrically connected, a busbar fixing portion 23 which is fixed and electrically connected to the fixing target portion 14 of the busbar 11, and an arm fixing portion 24 provided between the wire connection portion 22 and the busbar fixing portion 23 and fixed to the arm 13 of the busbar 11.

In this structure, the terminal to whose wire connection portion the wire is connected electrically is electrically connected to the busbar by fixing the busbar fixing portion of the terminal to the fixing target portion of the busbar. And the portion, between the wire connection portion and the busbar fixing portion, of the terminal is fixed to the arm by fixing the arm fixing portion located between the wire connection portion and the busbar fixing portion to the arm. With these structures, even if external force is exerted from the wire to the terminal at the time of, for example, routing of the wire, the degree of concentration of force on a base portion of the portion where the busbar fixing portion is fixed to the fixing target portion is made very low. Thus, the influence of external force on the portion where the busbar fixing portion of the terminal is fixed to the fixing target portion of the busbar is minimized, whereby the reliability of connection of the portion where the busbar and the terminal are electrically connected to each other can be kept high.

In the fixing structure, the fixing target portion 14 may project from one side edge of the arm 13 in a direction that is perpendicular to a projecting direction of the arm 13. The arm fixing portion 24 of the terminal 21 may be fixed to an end portion of the arm 13 locating on an opposite side of the busbar main body 12.

In this structure, the arm fixing portion of the terminal is fixed to the end portion of the arm. With this structure, the degree of concentration of force on the base portion of the portion where the busbar fixing portion is fixed to the fixing target portion which projects from the one side edge of the arm is made very low, whereby the reliability of connection of the portion where the busbar and the terminal are electrically connected to each other can be kept high.

In the fixing structure, the busbar fixing portion 23 of the terminal 21 may be crimped to the fixing target portion 14 by swaging. The arm fixing portion 24 of the terminal 21 may be fixed to the arm 13 by swaging.

In this structure, the busbar fixing portion of the terminal is crimped onto the fixing target portion and the arm fixing portion of the terminal is fixed, by swaging, to the arm. Thus, crimping of the busbar fixing portion onto the fixing target portion and fixing of the arm fixing portion to the arm can be performed as swaging operations of the same step. This makes it possible to fix the terminal to the busbar strongly without unduly complicating work of connecting the terminal to the busbar.

In the fixing structure, the busbar main body 12 may be held in a resin holding member 45. The holding member 45 may have, on two respective sides in a direction that is perpendicular to a projecting direction of the arm 13, support walls 52 which support the arm 13.

In this structure, even if the wire is pulled at the time of, for example, its routing and external force thereby acts on the arm, since both side portions of the arm are supported by the support walls of the holding member, deformation of the arm by such external force can be suppressed and the reliability of connection can be increased further.

According to embodiments, a busbar module includes a resin wire routing body 45 to be attached to a battery assembly 43 of a plurality of battery cells 42, and the fixing structure in which the terminal 21 is connected to the busbar 11 housed in a busbar housing unit 51 of the wire routing body 45.

In the busbar module, the portion, between the wire connection portion and the busbar fixing portion, of the terminal is fixed to the arm by the arm fixing portion. With this structure, even if external force is exerted from the wire to the terminal at the time of, for example, routing of the wire, the degree of concentration of force on a base portion of the portion where the busbar fixing portion of the terminal is fixed to the arm of the busbar is made very low. Thus, the influence of external force on the portion where the busbar fixing portion of the terminal is fixed to the fixing target portion of the busbar is minimized. As a result, in the busbar module, the reliability of connection of the portion where the busbar and the terminal are electrically connected to each other can be kept high.

DESCRIPTION OF REFERENCE NUMERALS

1: Wire
11: Busbar
12: Busbar main body
13: Arm
14: Fixing target portion
21: Terminal
22: Wire connection portion
23: Busbar fixing portion
24: Arm fixing portion
41: Busbar module
42: Battery cell
43: Battery assembly
45: Wire routing body (holding member)
51: Busbar housing unit
52: Support wall.

What is claimed is:
1. A fixing structure between a busbar and a terminal, comprising:
   the busbar; and
   the terminal,
   wherein the busbar includes:
      a busbar main body;
      an arm; and
      a fixing target portion,
   wherein the busbar main body, the arm and the fixing target portion are integrated in one piece,
   wherein the terminal includes:
      a wire connection portion to which a wire is to be electrically connected;
      a busbar fixing portion which is fixed and electrically connected to the fixing target portion of the busbar; and
      an arm fixing portion provided between the wire connection portion and the busbar fixing portion and fixed directly to the arm of the busbar.

2. The fixing structure according to claim 1, wherein the fixing target portion projects from one side edge of the arm in a direction that is perpendicular to a projecting direction of the arm from the busbar main body, and wherein the arm fixing portion of the terminal is fixed to an end portion of the arm locating on an opposite side of the busbar main body.

3. The fixing structure according to claim 1, wherein the busbar fixing portion of the terminal is crimped to the fixing target portion by swaging, and wherein the arm fixing portion of the terminal is fixed to the arm by swaging.

4. The fixing structure according to claim 1, wherein the busbar main body is held in a resin holding member, and wherein the holding member has, on two respective sides in a direction that is perpendicular to a projecting direction of the arm, support walls which support the arm.

5. A busbar module comprising:

a resin wire routing body configured to be attached to a battery assembly of a plurality of battery cells; and the fixing structure according to claim 1, in which the terminal is connected to the busbar housed in a busbar housing unit of the resin wire routing body.

6. The fixing structure according to claim 1, wherein the arm includes a swaging target portion which has a U-shape, and the arm fixing portion wraps around the swaging target portion.

7. The fixing structure according to claim 6, wherein the fixing target portion of the busbar is adjacent to the swaging target portion of the arm.

8. The fixing structure according to claim 1, wherein the arm includes a tip and the fixing target portion of the busbar is located at the tip of the arm.

\* \* \* \* \*